| United States Patent [19] | [11] 3,876,804 |
| Woodcraft | [45] Apr. 8, 1975 |

[54] ANTI-SMOKING CHEWING GUM PREPARATION

[75] Inventor: David C. Woodcraft, London, England

[73] Assignee: Abraham Rosenberg, Copenhagen, Denmark

[22] Filed: Sept. 14, 1972

[21] Appl. No.: 289,104

[30] Foreign Application Priority Data
May 1, 1972   United Kingdom............... 20106/72

[52] U.S. Cl. .................................................. 426/3
[51] Int. Cl. ........................... A23g 3/00; A23g 3/30
[58] Field of Search .......... 99/135; 131/8 A, 170 A, 131/171 A; 425/132; 426/3

[56] References Cited
UNITED STATES PATENTS
| 2,891,868 | 6/1959 | Higgie................................. 99/135 |
| 3,075,884 | 1/1963 | Bilotti.................................. 99/135 |

Primary Examiner—A. Louis Monacell
Assistant Examiner—J. M. Hunter
Attorney, Agent, or Firm—Watson, Cole, Grindle & Watson

[57] ABSTRACT

An anti-smoking preparation in the form of a chewing gum containing a silver salt and an ammonium compound dispersed in a chewing gum base together with sugar, flavourings and, if desired, co-carboxylase.

7 Claims, No Drawings

ANTI-SMOKING CHEWING GUM PREPARATION

BACKGROUND OF THE INVENTION

Silver salts have been used previously in anti-smoking preparations because of their unpleasant taste which is accentuated in contact with tobacco smoke. Such preparations have not, however, been widely accepted because the unpleasant taste of the silver salts in the absence of tobacco also spoils the flavour of food and drink.

Moreover, in addition to being toxic, the soluble silver salts used in the preparations are absorbed in the body and not excreted. By prolonged use, the accumulation of silver in the body could give rise to toxic side effects, and to e.g. argyria, which is a slate-grey or bluish or even black pigmentation of the skin, due to accumulation of absorbed silver in the corium of the skin. It becomes visible upon exposure of the skin to sunlight, and even if apparently otherwise harmless, once developed the condition is permanent.

SUMMARY OF THE INVENTION

According to the present invention there is provided an anti-smoking preparation which comprises a chewing gum base having associated therewith a silver compound in which the silver is bound in complex form or a silver compound and a compound which in its dissolved state forms ions which combine with silver to form silver complex ions.

The preparations in accordance with the invention overcomes the disadvantages associated with the use of silver salts in two ways. Firstly complexed silver ions do not have such a pronounced unpleasant taste in the absence of tobacco smoke, although an unpleasant taste is still developed in contact with tobacco smoke. Secondly slow release of the active ingredients from the chewing gum means that the user is not subjected to a sudden high concentration of silver salt as occurs when taking a tablet. The use of a chewing gum preparation has the additional virute that it gives the user a substitute for the tobacco habit.

In a preferred form the active ingredients of the preparation comprise a silver compound, an ammonium compound and a substance promoting a carboxylase effect.

Surprisingly, the silver complex ions are substantially as effective in providing an exceedingly unpleasant taste with tobacco smoke as are the free silver ions. Combined with the fact that the toxicity of the silver decreases proportionally with the complex binding this means that the silver complex compounds are particularly suited for use in an anti-smoking preparation. In addition the complex silver ions do not accumulate in the body but are excreted. This is particularly important since it is necessary to administer the preparation several times a day for several months in order to totally cure the smoking habit.

Several compounds are known to form complex ions with silver and are non-toxic in the amounts necessary to be effective in an anti-smoking preparation. The preferred compounds, however, are ammonium compounds which rapidly bind any free silver ions to form the stable, complex silver diamine ions having a complexicity constant as high as $1.4 \times 10^7$ at room temperature.

Thiosulphates may also be used to form complex silver compounds which can be used in the present compositions, since they are practically non-toxic. However, they taste less unpleasant in contact with tobacco smoke.

Even the very insoluble silver chloride forms rather more soluble complex compounds with e.g. hydrochloric acid and chlorides, and may be used, e.g. together with ammonium chloride, in the preparations of the invention.

The silver salt is preferably silver lactate or silver acetate, but also less soluble silver salts may be used, since the resulting formation of the silver diamine complex increases the solubility.

The active ingredients are conveniently incorporated into the gum base by addition to the gum base in a suitable mixer. Alternatively the active ingredients may be included in a coating which is applied to preformed sticks of chewing gum.

While it is generally more convenient to employ an uncomplexed silver salt and a complexing agent, a preformed silver complex (particularly certain silver amines which are stable solids at room temperature) may be used as such in the preparations of the invention.

The silver salt is preferably silver lactate or silver acetate but less soluble silver salts may also be used since the formation of the silver complex increases the water solubility.

Preferably, the formulation includes flavouring agents to provide a pleasant taste to an otherwise slightly unpleasant tasting preparation. To make the preparation universally acceptable, it is desirable to include a flavour such as spearmint, peppermint or a citrus and/or acid fruit type flavour e.g. orange, lemon or cherry. The flavours specifically mask the initial, at least to some persons, unpleasant taste of the unflavoured preparation, and are also effective in promoting salivery flow to quickly provide an adequate solvent phase for the complex formation in preparations which do not initially contain the silver in complex form.

As stated hereinbefore, the preparations of the invention also include a content of co-enzymes, especially co-carboxylases, as in the known preparations. The co-carboxylases are known to promote salivary flow and are probably also effective in reducing keto acids, such as pyruvic acid, in the tobacco smoke to unpleasant tasting aldehydes.

DETAILED DESCRIPTION OF THE INVENTION

An anti-smoking chewing gum preparation according to the invention preferably has a piece weight of from about 1000 to 2000 milligrams, e.g. 1200 to 1800 milligrams. Preferably each piece contains from about 2 to 6 milligrams of silver acetate, from about 4 to 10 milligrams of ammonium chloride and from about 0.02 to 0.05 milligrams of co-carboxylase.

The following Example, in which all parts are by weight, is given to illustrate the invention:

EXAMPLE

A gum base was prepared by mixing 67 parts of cane sugar and 14 parts of glucose with 18 parts of gum chicle and heating the mixture in a water bath. The resulting plastic mass is well worked in a mixing machine and one part of peppermint oil flavouring was then added together with 0.2 parts of silver acetate, 0.7 parts of ammonium chloride and 0.003 parts of co-carboxylase and mixed in. When a uniform mix had been obtained, the plastic mass was rolled out, cut into pieces each weighing approximately 1500 milligrams, dusted with sugar and packed.

I claim:

1. An anti-smoking chewing gum preparation comprising:

an effective, non-toxic amount of an active material carried by said gum base, said active material being capable of developing an unpleasant taste when contacted by tobacco smoke and being selected from the group consisting of water soluble silver amine complexes and mixtures of at least one silver salt and an ammonium salt capable of combining with silver to form a water soluble silver amine complex, said ammonium salt being present in each of said mixtures in a quantity effective to bind any free silver ions from said silver salt.

2. A preparation according to claim 1 in which a co-carboxylase is also present.

3. A preparation as set forth in claim 1 wherein said active material is a silver amine complex.

4. A preparation as set forth in claim 1 wherein said active material is one of said mixtures.

5. A preparation according to claim 4 in which the ammmonium salt is present in a molar amount of at least about twice the silver salt.

6. A preparation as set forth in claim 1 wherein the active material is dispersed in the gum base.

7. A preparation as set forth in claim 1 wherein the active material is contained in a coating applied to the gum base.

* * * * *